United States Patent

[11] 3,580,559

[72] Inventors Rudolf Spieth
Plochingerstrasse 156, Esslingen;
Gunter Otto, Lindenstrasse 3, Altbach,
Germany
[21] Appl. No. 775,472
[22] Filed Nov. 13, 1968
[45] Patented May 25, 1971
[32] Priority Oct. 1, 1968
[33] Germany
[31] P 18 00 020.9

[54] HYDROPNEUMATIC PISTON-CYLINDER ARRANGEMENT
11 Claims, 2 Drawing Figs.

[52] U.S. Cl. ........................................... 267/126
[51] Int. Cl. ........................................... F16g 9/08
[50] Field of Search ........................................... 267/117,
113, 120, 124, 126

[56] References Cited
UNITED STATES PATENTS

| | | | | |
|---|---|---|---|---|
| 2,587,121 | 2/1952 | Deardorff et al. | | 267/1(17) |
| 3,281,138 | 10/1966 | Oster | | 267/1(24) |
| 3,471,140 | 10/1969 | Ballard | | 267/1(17) |

*Primary Examiner*—James B. Marbert
*Attorney*—Stevens, Davis, Miller & Mosher

ABSTRACT: An improved hydropneumatic piston-cylinder arrangement, adapted to be blocked from the outside, with a fluid-filled and a gas-filled chamber, a piston mounted in the fluid-filled chamber with an externally projecting piston rod, wherein the chamber filled with fluid contains a fixed partition provided with passages for the fluid and the said passages are completely closing by blocking means adapted to be opened from the outside. The arrangement may be constructed as a tension spring or as a compression spring, wherein the compression spring construction is preferred for the lockable, stepless adjustment of table tops, driving seats and the like.

Patented May 25, 1971
3,580,559
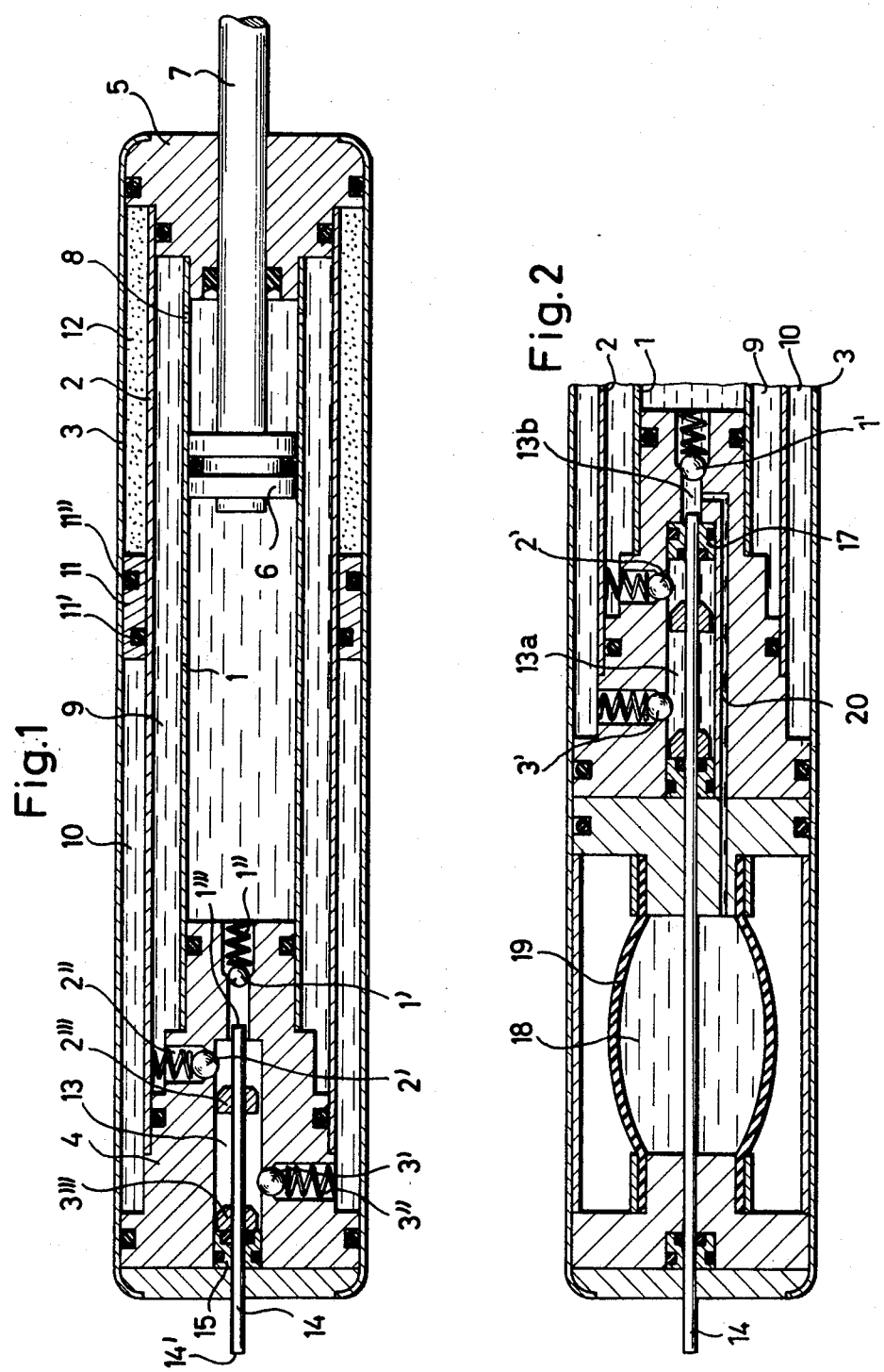

HYDROPNEUMATIC PISTON-CYLINDER ARRANGEMENT

The invention relates to a hydropneumatic piston-cylinder arrangement, adapted to be locked from the outside, with a fluid-filled and a gas-filled chamber, and with a piston slidingly mounted in the fluid-filled chamber and having a piston rod extending therefrom.

A number of lockable hydropneumatic piston-cylinder arrangements are known in the art; these are constructed as compression springs and are used mainly for the stepless vertical adjustment of chairs or tables.

A known hydropneumatic piston-cylinder arrangement, adapted to be locked from the outside, consists of one cylinder filled with one or more pressure media, in which a piston with a piston rod is slidingly mounted. The piston is sealed against the inner wall of the cylinder and has one or more flow passages which permit the flow of the pressure medium from one side of the piston to the other, when the piston is displaced within the cylinder. The flow cross section of these passages, forming a communicating channel between the two sides of the piston, can be blocked by obturating means, adapted to be operated from the outside. The external operation may be effected by rotating or axially displacing a control rod, mounted inside the hollow piston rod, such as is known in the operation of shock absorbers.

This known compression spring which is used as a lifting or raising unit, has a number of disadvantages. Thus, for example, the useful life of the obturating and sealing means, required for closing the flow cross section of the communicating channel and hence for the blocking, is very short, partly due to the fact that under the tension and compression forces acting on the piston rod, the direction of the stress acting on the obturating and sealing means changes continuously. This continuous alternation in the application of the force occurs particularly, where this unit is used for adjusting driving seats in vehicles, because the vibrations and oscillations occurring in the vehicle give rise to continuous alternations between tension and compression.

Another drawback is that, under strong tensile stress, the obturating means may be lifted off the sealing face and this, too, leads to considerable wear and accelerated leakage. In addition, in this case, the blocking will become ineffective, i.e., it will be effective only up to a certain maximum tensile force.

In a similar manner, also the blocking against compression is limited, namely by the pressure of the pressure gas charge and the surface area of the piston. When the force resulting therefrom is exceeded, the pressure gas is compressed and the blocking becomes ineffective. This is particularly undesirable when the device is fitted in automobiles for adjusting the slope of the seat, because with strong braking there exists the danger of a passenger sitting on the rear seat being thrown forward, thereby pushing the backrest of the front seat forward if the impact exceeds the maximum blocking effort. Furthermore, the known hydropneumatic piston-cylinder arrangement has also disadvantages with regard to the manufacture and strength, since hardening of the hollow piston rod is impossible, because owing to its small cross section, the same would harden through and would be too brittle.

In another known hydropneumatic lifting unit, constructed as a compression spring, a fixed partition is arranged inside the cylinder and is bridged by a bypass extending outside the cylinder wall, permitting the fluid to flow over from one side of the partition to its other side, when the piston is displaced. This bypass may be closed by means of an externally operable slide valve, sliding on the cylinder wall, so that the whole arrangement can be blocked. Also here, the sealing difficulties mentioned above are again partly encountered. In addition, the bridging of the cylinder partition by an external bypass results in a comparatively expensive construction which is, moreover, liable to breakdown.

The invention has therefore as a principal object the elimination of the above-mentioned drawbacks and of providing an improved hydropneumatic piston-cylinder arrangement, adapted to be blocked from the outside, in which sealing difficulties have been eliminated and complete blocking has been achieved both under tension and under compression.

According to the invention, this object is realized in that there is arranged, within the fluid-filled chamber of the piston-cylinder device, a fixed partition with flow passages for the liquid and in that the flow passages are adapted to be completely blocked by obturating means operable from the outside.

A preferred embodiment of the invention comprises three cylinders in concentric arrangement, namely an inner cylinder, a center cylinder, and an outer cylinder, which are all sealingly connected at their ends remote from the piston rod end by a body forming the said partition, having flow passages or channels for the fluid which interconnect the interior spaces of the three cylinders and are adapted to be completely obturated from the outside.

In a preferred embodiment, the said obturating means consist of spring-loaded ball valves which can all be opened simultaneously by moving from the outside a control rod mounted in the said body and open the flow cross section of the flow passages for the fluid.

In yet another preferred embodiment, there are altogether three flow passages located in the said body, each with a spring-loaded ball valve and each associated with one of the cylinders.

Preferably, the said inner cylinder and an annular space between the inner cylinder and the center cylinder are completely filled with fluid, whilst an annular space between the center and outer cylinders is filled with fluid and with gas, the two charges being separated from each other by a sliding piston.

The piston mounted inside the inner cylinder may be of solid construction and sealed against the inner cylinder, whilst the part of the inner chamber of the inner cylinder on the side of the piston rod communicates with the annular space between this cylinder and the center cylinder via a bore.

Preferably, the ball valves associated with the inner cylinder and with the center cylinder are so mounted with regard to their closing directions that they are urged on to their seats both by tensile and by compressive forces acting on the piston rod.

In another preferred embodiment of the invention, in which the hydropneumatic piston-cylinder arrangement is a compression spring, the flow passages communicate on the one hand with their associated cylinders and on the other hand all with a chamber which is sealed against the ambient air and is filled with fluid at a pressure equal to that of the gas.

A particularly convenient construction is a hydropneumatic piston-cylinder arrangement, wherein the said chamber is divided by a seal into two part chambers or cavities, of which one communicates with the two flow passages associated with the outer and center cylinders and the other with the flow passage associated with the inner cylinder, and wherein the said first part chamber is filled with fluid at a pressure equal to the pressure of the gas, whilst the other part chamber is filled with fluid at a pressure substantially equal to, or slightly higher than, the atmospheric pressure. A tension spring constructed in this manner has, in the same way as the compression spring, the great advantage that both under tensile and under compressive forces acting on the piston rod, complete blocking is possible, which was not the case in hitherto known arrangements.

The part chamber affected by a pressure of the order of the atmospheric pressure communicates preferably with a storage and balance tank with fluid at atmospheric pressure or at a pressure slightly above the atmospheric pressure, wherein the wall of the said storage and balance tank may consist at least in part of an elastic diaphragm. Conveniently, the storage and balance tank is arranged inside the outer cylinder at the end thereof remote from the piston rod end.

Further features and advantages of the invention will become apparent from the following description of two preferred embodiments of hydropneumatic piston-cylinder arrangements according to the invention, from the accompanying drawings, and from the appended claims.

In the drawings:

FIG. 1 is a longitudinal cross section of a first embodiment, constructed as a compression spring;

FIG. 2 is a longitudinal cross section of a second embodiment, constructed as a tension spring.

In the embodiment illustrated in the drawing, there are provided three concentric cylinders, namely an inner cylinder 1, a center cylinder 2 and an outer cylinder 3. These cylinders are all closed at one end by a body 4 so that this end is tightly sealed. At the other end, a closing body 5 is pushed into the open ends of the cylinders and sealed at this point. A piston 6 is slidingly mounted within the inner cylinder 1 and is sealed against the same. The piston 6 is connected to a piston rod 7, passing in sealing engagement through the closing body 5. The whole interior space of the inner cylinder 1 is filled with a fluid, e.g., with oil, and communicates via a bore 8 with an annular chamber 9, formed by the outer wall of the inner cylinder 1 and the inner wall of the center cylinder 2. A further annular chamber 10, formed by the outer wall of the center cylinder 2 and the inner wall of the outer cylinder 3, contains a fluid and an oil charge, which are separated from one another by a sliding piston seal 11. The sliding piston 11 is provided with two seals 11' and 11'' (for example, O-rings), of which each seals against one of the annular surfaces so that the seal has a very long useful life. The pressure gas is in a chamber 12 of the annular space 10.

Each cylinder is associated with its own separate blocking means. These three blocking means consist of spring-loaded ball valves 1', 2' and 3'. These spring-loaded ball valves 1', 2' and 3' are constructed to close three flow passages 1'', 2'' and 3'', each of which is associated with one of the cylinders. The three flow passages 1'' to 3'' arranged within the body 4 communicate on one hand with the associated cylinder 1 to 3 and on the other hand with a chamber or cavity 13, also located in the body 4.

The ball valves 1' to 3' are actuated, that is to say, opened, by means of an actuating or control rod 14, slidingly mounted in the cavity 13 and equipped with two control rings 2''' and 3''' for opening the two ball valves 2' and 3'. The operation, i.e., the opening of the ball valve 1' is effected by end 1''' of the control rod 14, shown on the right in the drawing. The other end 14' of the control rod 14, shown on the left extends in sealing engagement towards the outside so that the ball valves 1' to 3' can be actuated from the outside. The cavity 13 is sealed by a seal 15, serving simultaneously as guide and gasket for the control rod 14.

A hydropneumatic piston-cylinder arrangement of this kind, constructed as a compression spring, operates as follows:

By pushing the control rod 14 into the cavity 13, all three ball valves 1' to 3' are opened simultaneously and open the flow cross sections of the passages 1'' to 3''. In consequence, the inner cylinder and the two annular spaces communicate so that when the piston rod 7 is pushed by an externally applied force into the interior of the cylinder 1 then the pressure gas in the chamber 12 of the annular gap 10 is compressed. During this, oil flows first from the left part of the cylinder 1 through the passage 1'' into the cavity 13. From here, the flow of oil is branched into a first partial flow, flowing through the passage 2'' into the annular space 9 and through the hole 8 into the piston rod side chamber of the interior of the cylinder 1, whilst the second partial flow enters through the passage 3'' into the annular gap 10 and displaces the sliding piston 11 towards the right, as viewed in the drawing. This causes the pressure gas trapped in the chamber 12 to be compressed. Thus, when the ball valves 1' to 3' are open, the piston rod 7 is affected by a pressure force resulting from the gas or fluid pressure and the area of the piston rod. Since this force is effective in the direction of the outlet end of the piston rod and tries to move the same out of the interior of the cylinder 1, this arrangement acts as a compression spring in which the forces acting on the piston rod or on the cylinders are absorbed by the pressure gas charge in the chamber 12.

When the control rod 14 is released, it is displaced by the spring-loaded ball valves 1' to 3' towards the left, and the ball valves 1' to 3' close the cross sections of the flow passages 1'' to 3'' completely. This closes any connection between the annular spaces and the interior of the inner cylinder 1, since the cavity 13 is closed against these spaces. In view of the liquid volume trapped in the interior of the inner cylinder 1 and the annular chamber 9, the piston 7 and the piston 6 can no longer be displaced, and the whole arrangement is blocked. Of special interest is the fact that the blocking produced in this manner is complete, i.e., is not overridden when a maximum force is exceeded, as is the case in known arrangements. In addition, there is also the further advantage that this absolute blocking, which is not limited in its maximum force, applies both to tensile and compressive forces acting on the piston rod. This is not so with hitherto known arrangements of the kind initially described.

Of great importance is also the fact that the ball valves 1' and 2' are pressed onto their seats both by tensile and by compressive forces acting on the piston rod. Hence, there is no alternation in the stress, as in some known devices, and sealing difficulties and problems no longer occur, whilst the useful life of the ball valves is substantially longer.

In some applications, where the end 14' of the control rod 14, protruding from the left end, is considered to be an obstruction, the control rod 14 may be arranged without difficulties at right angles to the longitudinal axis of the piston-cylinder device so that the left end thereof is free to accept a connecting member.

A further substantial advantage of the piston-cylinder device according to the invention is that the same may be constructed in the simplest possible manner and with only very small structural changes as a tension spring, such as shown in FIG. 2. In FIG. 2, only the left portion, containing the blocking mechanism, is shown, the remaining part being identical to the arrangement shown in FIG. 1. Corresponding parts are designated in both FIGS. by the same reference numerals.

The main distinction of the arrangement of FIG. 2, constructed as a tension spring, is that the cavity 13 is divided into two partial chambers 13a and 13b, of which the first chamber, 13a is filled with fluid at a pressure equal to the gas pressure, and the second chamber 13b with fluid at a pressure substantially equal to the atmospheric pressure or slightly higher than the same. The left side of the piston 6 (as viewed in the drawing) is therefore affected by the atmospheric pressure when the ball valve 1' is open, whilst the piston rod side of the piston is affected by a high gas pressure so that the piston rod 7 with the piston 6 is pushed into the inner cylinder 1 and the arrangement acts as tension spring, as hereinafter described.

The chamber 13a under high pressure is sealed against the chamber 13b under low pressure by means of a ring seal 17, serving simultaneously as guide for the right end of the control rod.

The low pressure chamber 13b is connected to a storage and balance tank 18, filled with fluid at a pressure substantially equal to, or only slightly higher or lower than, the atmospheric pressure. The interior of the storage tank 18 is surrounded by an annular, elastic diaphragm 19. The balance tank 18 is mounted inside the outer cylinder 3 within the left end zone thereof and is thus completely closed towards the outside by the outer cylinder 3. This ensures additionally also a very compact construction.

The chamber 13b communicates with the storage tank 18 via a connecting conduit 20.

The hydropneumatic piston-cylinder device shown in FIG. 2 and acting as a tension spring operates as follows:

When the control rod 14 is pushed to the right to open the ball valves 1' to 3', a connection is formed between the two annular spaces 9 and 10, and between the interior of the inner cylinder 1 which does not contain the piston rod 7 and the storage tank 18, via the partial chambers 13a and 13b respectively.

The conduit 20, connecting the partial chamber 13b with the storage tank 18 equalizes the pressure between the part of the inner cylinder 1, which does not contain the piston rod 7, and the storage tank 18, i.e., the pressure in this part of the interior of the inner cylinder 1 is substantially equal to the atmospheric pressure. Since the pressure in that portion of the interior of the cylinder 1, which contains the piston rod 7, is substantially equal to the high gas pressure, the piston rod is pushed into the inner cylinder 1 and the arrangement acts as a tension spring, absorbing tensile forces acting on the piston rod 7 by means of the pressure gas in the chamber 12.

When the control rod 14 is released, it is pushed towards the left by the action of the spring-loaded ball valves 1' to 3' and the latter close. Hence, all interior spaces of the three cylinders 1 to 3 are separated from one another and the device is locked, since the trapped fluid columns prevent the piston rod 7 with the piston 6 from moving in the cylinder 1. As already described above with reference to the device in the form of a compression spring, also here there is the advantage of a blocking action which is not restricted in its maximum effort and the further advantage that the absolute blocking remains effective both with tensile and compressive forces. Also in the construction as tension spring, in the locked state the valve balls 1' and 2' are pressed onto their seat so that there are no sealing problems or difficulties.

In view of the absolute locking action according to the invention both under tensile and under compressive forces, the fact is important that altogether three concentrically arranged cylinders are provided with the different cavities resulting from this arrangement, which communicate through flow passages in the body 4, serving as fixed partition wall, and wherein these flow passages can be closed.

The cavity 18 and the diaphragm 19 are so constructed that, when the piston rod 7 enters, the fluid displaced thereby is taken up by the elastic deformation and expansion of the diaphragm 19, causing an increase in the interior space of the storage tank 18. The resetting forces of the diaphragm acting on the fluid should be as small as possible so that the pressure in the tank 18 is not increased, which would reduce the useful pressure differential compared with the pressure of the pressure gas.

As may be seen easily from a comparison of the arrangements of FIGS. 1 and 2, a lockable, hydropneumatic piston-cylinder device according to the invention may be adapted to act as compression or as tension spring by effecting small structural modifications.

Further advantages of the hydropneumatic piston-cylinder arrangement according to the invention, compared with the known piston-cylinder devices initially described, relate to the following points.

The strength of the piston rod is very favorable, because the same is solid and can therefore be hardened, whilst the known piston rods are hollow and must receive a control rod, and cannot, therefore be hardened. Thus, the piston rod according to the invention can withstand substantially higher loads and forces, both by virtue of the greater solid cross section and the higher material strength.

In a number of applications, the pressure of the pressure gas may be lower than in known arrangements, because according to the invention, the pressure gas is not used for blocking but only for the spring action.

Any gases may be used for the gas charges and any fluids for the fluid charges, and more particularly hydraulic oils.

A hydropneumatic, lockable, piston-cylinder device according to the invention may be used as tension or compression spring for any known suspension. A particularly suitable application is the infinitely variable adjustment of table tops and chairs, and of the backrests and seats, especially in automobiles and aircraft.

We claim:

1. A lockable piston-cylinder arrangement having two concentric cylinders filled with a pressure fluid and a first overflow opening connecting the two cylinders comprising:

a. an imperforate piston in the center cinder having a piston rod extending outwardly through a sealing opening in one end of said cylinder;
 b. a closing member which closes off the two cylinders at the end opposite the piston rod;
 c. a hollow space within said closing member;
 d. second overflow openings, one connecting said hollow space and one cylinder and the other connecting said hollow space with the other cylinder;
 e. shutoff means on each said second overflow opening biased toward said hollow space;
 f. actuating means actuatable from the outside to open said shutoff means against their bias to permit an exchange of pressure fluid between said two cylinders via the hollow space.

2. Piston-cylinder arrangement according to claim 1 in which the two shutoff members are arranged in the closure member and in which the actuating means is a control rod arranged in the hollow space and provided with means to engage the shutoff members for displacing the latter into their own positions.

3. Piston-cylinder arrangement according to claim 1 having another cylinder which concentrically surrounds the two cylinders, the inner and central cylinders being completely filled with a pressure liquid and the outer cylinder being partially filled with a pressure liquid; another overflow opening in the closure member which is associated with the outer cylinder and connects it with the hollow space; another shutoff means actuatable from the outside and arranged in said another overflow opening biased toward the hollow space; actuating means actuatable from the outside to open said another shutoff means against its bias to permit an exchange of pressure fluid between the three cylinders via the hollow space.

4. Piston-cylinder arrangement according to claim 3 in which the actuating device consists of a control rod arranged in the hollow space and displaceable from the outside and provided with two control rings for displacing the shutoff members associated with the middle and outer cylinders into their open positions, while the end of the control rod is positioned to engage the shutoff member associated with the inner cylinder for the displacement thereof into its open position.

5. Piston-cylinder arrangement according to claim 4 in which the individual shutoff members are ball valves.

6. Piston-cylinder arrangement according to claim 1 in which the piston is sealed with respect to the inner wall of the inner cylinder and the first overflow opening consists of a passage bore in the wall of the inner cylinder located on the piston-rod side of the inner cylinder and connecting the inner cylinder with the middle cylinder.

7. Piston-cylinder arrangement according to claim 3 in which, when the piston-cylinder arrangement is used as a tension spring, the hollow space is divided into two parts, the first of which is in communication with the two overflow openings associated with the outer and the middle cylinders and the other with the overflow opening associated with the inner cylinder, the first mentioned part being filled with liquid the pressure of which is approximately equal to the pressure of a gas partially filling the outer cylinder, while the second mentioned part is filled with liquid the pressure of which is approximately equal to or slightly greater than atmospheric pressure.

8. Piston-cylinder arrangement according to claim 7 in which the said second part is in communication with a storage and equalization container which contains a liquid of atmospheric pressure or slightly greater pressure.

9. Piston-cylinder arrangement according to claim 8 in which the wall of the supply and equalization container consists at least in part of an elastic membrane.

10. Piston-cylinder arrangement according to claim 9 in which the storage and equalization container is enclosed and screened off from the outside by the end of the outer cylinder opposite the piston rod.

11. A lockable piston-cylinder arrangement having two closed concentric cylinders filled with a pressure fluid and a first passage connecting the two cylinders, comprising:
   a. An imperforate piston in the center cylinder having a piston rod extending outwardly through a sealing opening in one end of said cylinder;
   b. a closed cavity having second passages, one in communication with the outer cylinder and another in communication with the end of the center cylinder which is opposite the piston rod;
   c. one way valve means biased toward said cavity in each of said second passages;
   d. means actuatable from outside to open said valves against their bias to permit an exchange of liquid between said cylinder via the cavity.